United States Patent
Olrik (10) Patent No.: US 9,217,496 B2
(45) Date of Patent: Dec. 22, 2015

(54) FRICTION DRIVING MECHANISM

(75) Inventor: Henrik-Gerner Olrik, Humlebæk (DK)

(73) Assignee: Liniax ApS, Silkeborg (DK)

( * ) Notice: Subject to any disclaimer, the term of this patent is extended or adjusted under 35 U.S.C. 154(b) by 265 days.

(21) Appl. No.: 13/878,486

(22) PCT Filed: Oct. 3, 2011

(86) PCT No.: PCT/DK2011/000110
§ 371 (c)(1),
(2), (4) Date: Jun. 6, 2013

(87) PCT Pub. No.: WO2012/048709
PCT Pub. Date: Apr. 19, 2012

(65) Prior Publication Data
US 2013/0252782 A1    Sep. 26, 2013

(30) Foreign Application Priority Data
Oct. 12, 2010  (DK) ................................. 2010 00925

(51) Int. Cl.
*F16H 19/02*    (2006.01)

(52) U.S. Cl.
CPC ..................................... *F16H 19/025* (2013.01)

(58) Field of Classification Search
CPC ................................. F16H 19/25; F16H 19/02
See application file for complete search history.

(56) References Cited

U.S. PATENT DOCUMENTS

| | | | |
|---|---|---|---|
| 2,152,518 A | 12/1937 | Wolff | |
| 2,715,925 A * | 8/1955 | Morgan | 269/188 |
| 2,756,609 A * | 7/1956 | Hogan et al. | 74/424.73 |
| 2,820,367 A | 1/1958 | Frantz | |
| 2,894,401 A * | 7/1959 | Stal | 74/99 R |
| 2,940,322 A * | 6/1960 | Uhing | 74/22 R |
| 3,046,801 A | 7/1962 | Pravel | |
| 3,431,678 A * | 3/1969 | Stuart, Jr. et al. | 49/360 |
| 3,443,443 A | 5/1969 | Spence | |
| RE27,711 E | 7/1973 | Steibel | |
| 4,141,255 A * | 2/1979 | Nilsson | 74/25 |

(Continued)

FOREIGN PATENT DOCUMENTS

| | | |
|---|---|---|
| CN | 2833 242 Y | 11/2006 |
| CN | 2931 939 Y | 8/2007 |

(Continued)

OTHER PUBLICATIONS

International Search Report completed Jan. 30, 2012 for International Application No. PCT/DK2011/000110.

*Primary Examiner* — David M Fenstermacher
(74) *Attorney, Agent, or Firm* — Brinks Gilson & Lione (57) ABSTRACT

Friction driving mechanism for converting a rotating movement of a member into an axial movement of the same and consisting of driving means and to its rotating member connected friction means. The friction means comprises a holder 3, in which there is a number of mutually movable and with the holder 3 in relation to the shaft rotating balls as the axes of rotation of the balls 5 are oblique in relation to the longitudinal axis if the shaft 1. Each of the rotatable balls 5 are according to the invention embedded in rotatable bearing bushes 6. If the shaft 1 meets a stop so that the balls 5 no longer are able to transmit an axial movement to the shaft 1 the axes of rotation of the balls 5 will try to adjust so as to be approximately parallel to the shaft 1. As a result the balls 5 at regular intervals will change position so that the wear is equally distributed over the whole surface of each ball. The advantage is that the friction driving mechanism has a longer lifetime than previously known.

9 Claims, 8 Drawing Sheets

(56) References Cited

U.S. PATENT DOCUMENTS

| | | | |
|---|---|---|---|
| 4,203,328 A | | 5/1980 | DeBoynton |
| 5,832,776 A | * | 11/1998 | Kuo .................................. 74/89 |
| 6,081,050 A | | 6/2000 | Hong et al. |
| 6,568,293 B1 | * | 5/2003 | Powell ....................... 74/424.73 |

FOREIGN PATENT DOCUMENTS

| | | |
|---|---|---|
| DE | 300 29 36 A1 | 7/1981 |
| EP | 00 95 891 A1 | 12/1983 |
| GB | 2 171 169 A | 8/1986 |
| SU | 449 191 A1 | 11/1974 |

* cited by examiner

FRICTION DRIVING MECHANISM

This application claims the benefit under 35 U.S.C. §371 of International Application No. PCT/DK2011/000110, filed Oct. 3, 2011, which claims the benefit of Danish Application No. PA 2010 00925, filed Oct. 12, 2010, which are incorporated by reference herein in their entirety.

FIELD OF THE INVENTION

The invention is related to a friction driving mechanism for converting a rotating movement of a member into an axial movement of the same and consisting of driving means and to its rotating member connected friction means, said friction means comprising a holder, in which there is a number of mutual movable and with the holder in relation to the rotating member rotatable balls, the axes of rotation of said balls being oblique in relation to the longitudinal axis of the rotating member.

BACKGROUND ART

U.S. Pat. No. 3,046,801 (Pravel) describes such a friction driving mechanism where each ball may rotate about an oblique axis through the ball. A disadvantage of this construction is that the force which may be transmitted by the balls to the axially movable shaft, is not sufficient high even if one has tried to remedy this by pressing the balls against the shaft by means of special rings. It is also assumed that the lifetime is insufficient due to wear.

U.S. Pat. No. 4,203,328 and U.S. patent Re 27,711 describes a friction driving mechanism which is able to convert a rotating movement into an axial movement. Also these constructions seem to have a limited lifetime due to wear.

U.S. Pat. No. 3,443,443 describes a friction driving mechanism for converting a rotating movement into an axial movement. This mechanism consists of driving means and friction means connected to a member rotating with its rotating member, the shaft. The friction means comprises a holder embedding a number of mutually movable and with the holder in relation to the shaft rotatable balls, the axis of rotation of said balls being oblique in relation to the longitudinal axis of the shaft. A disadvantage of this mechanism is that the balls in the friction means primarily are worn along equator with regard to their axes of rotation.

DESCRIPTION OF THE INVENTION

The object of the invention is to provide a friction driving mechanism of the above mentioned type and having a substantially longer lifetime than previously known.

A friction driving mechanism of the above mentioned type is according to the invention characterised in that each of the rotatable balls extremely is placed in rotatable bearing bushes which at least in some areas are closely connected to the ball and are in friction engagement therewith. If the shaft meets a stop so that the balls no longer will be able to transmit an axial movement to the shaft, the axes of rotation of the balls will try to adjust themselves so as to be approximately parallel to the shaft. This is possible as the individual ball is able to rotate in relation to the bearing bush. As a result the balls at regular intervals will change position especially axes of rotation and the wear is thereby equally distributed over the whole surface of the ball contrary to previous constructions where the wear of the balls only happened along equator in relation to the fixed axis of rotation.

According to the invention the holder may consist of two portions connected to each other via elastic clamping means clamping against the rotatable bearing bushes for the balls.

Further according to the invention the clamping means may be adjustable, f. inst. by adjusting the distance between the two portions of the holder.

In a special embodiment according to the invention the shaft is surrounded by at least two balls rotatable around axes, which are oblique in relation to the longitudinal axis of the shaft.

The axes of rotation of the balls may be oblique so as to provide an increase of 1-30 degrees, preferably 9 or 14 degrees.

The balls may according to the invention be surrounded by a bearing bush. As a result the balls are pressed against the shaft and a higher force could be transmitted to the shaft.

The holder in which the balls are embedded can according to the invention be fixed in relation to an outer fixed house while the bearing bush can rotate freely.

According to the invention the bearing bush may be fixed in relation to the outer house, while the holder, in which the balls are embedded, may rotate freely.

Finally according to the invention the surrounding bearing bush may consist of two in relation to each other axial movable portions. As a result it is possible to adjust the maximal force to be transmitted to the shaft.

BRIEF DESCRIPTION OF THE INVENTION

The invention will be further explained in the following with reference to the drawings in which.

BEST MODES FOR CARRYING OUT THE INVENTION

Figure 1:
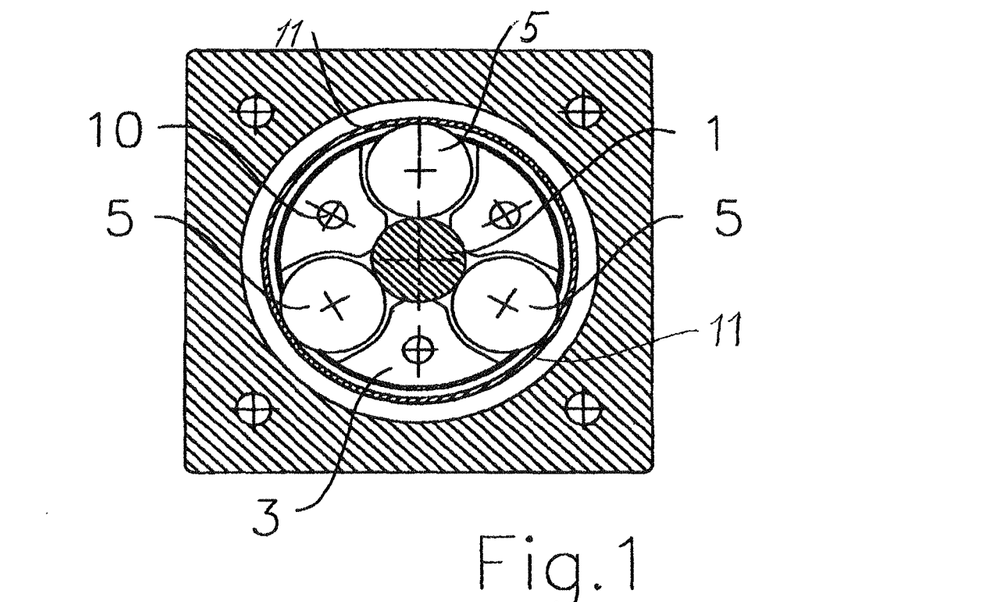
FIG. 1 illustrates a sectional view of a first embodiment of a friction driving mechanism according to the invention for converting a rotating movement into an axial movement FIG. 2 a longitudinal sectional view of the friction driving mechanism in FIG. 1, where an inner house in which balls are embedded, is secured in relation to an outer house FIG. 3 another embodiment of a friction driving mechanism in which a bearing bush outside the balls is fixed in relation to the outer house, while the inner house (the holder), in which the balls are embedded, is rotatable, partly in sectional view FIG. 4 a longitudinal sectional view of the friction driving mechanism in FIG. 3 which also illustrates one of the clamping means of the inner house (the holder)
Figure 2:
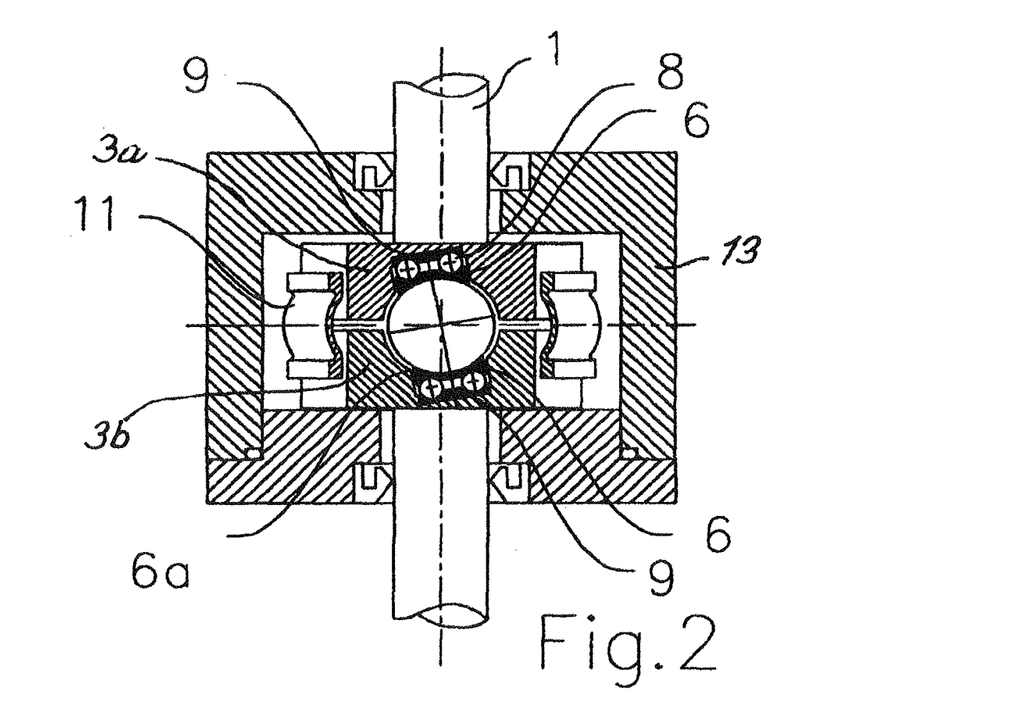

The friction driving mechanism according to the invention illustrated in FIG. 1 for converting a rotating movement of a shaft into an axial movement of the same consists of driving means and with the rotating portion (the shaft 1) connected friction means. The friction means comprises an inner house in form of a holder 3 in which there is a number of mutually movable and with the holder 3 in relation to the shaft 1 rotating balls 5 or substantially ball formed bodies, the axis of rotation of each ball 5 being oblique in relation to the longitudinal axis of the rotating shaft 1. Each of the rotatable balls 5 is according to the invention extremely placed in a rotatable substantially ball surface formed bearing bush 6, said bearing bush preferably being provided with protruding edges 6a along the border, conf. FIG. 2. The bearing bushes 6 comprises f. inst. angle contact ball bearings or angle contact roller bearings. The oblique position of the balls 5 may f. inst. be of such a value that the increase is approximately 1-30 degrees, preferably 9 or 14 degrees. If the shaft 1 during an axial movement meets a stop so that the balls 5 no longer will be able to transmit an axial movement to the shaft 1, the axes of rotation of the balls will try to adjust so as to be approximately parallel to the shaft 1. This is possible as each ball 5 may turn in relation to the bearing bush 6. The bearing bushes 6 may at least in some areas have approximately the same form as the balls 5 and in said areas be closely connected to the individual ball 5. In a special suitable embodiment is each bearing bush 6 provided with protruding edges 6a along the border. As a result a suitable friction between the ball 5 and the bearing bush 6 is obtained. The protruding portions of the bearing bushes 6 are not necessarily placed along the border.

Due to the fact that the balls 5 at regular intervals—each time the shaft 1 meets a stop—change position, especially axes of rotation, the wear of the balls 5 is equally distributed over the whole surface of each ball. The result is that each ball 5 will maintain its ball form, even after operation in a longer period.

Figure 4:
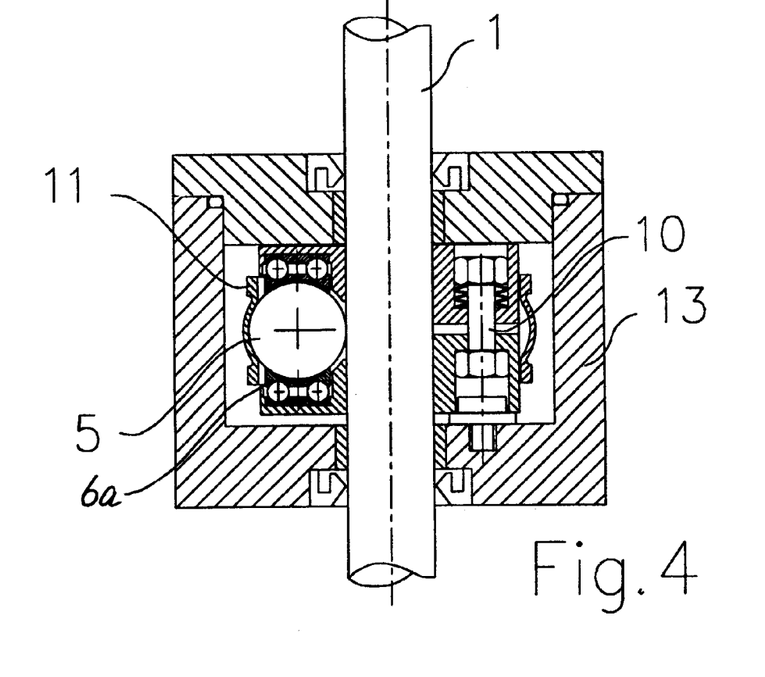
Figure 5:
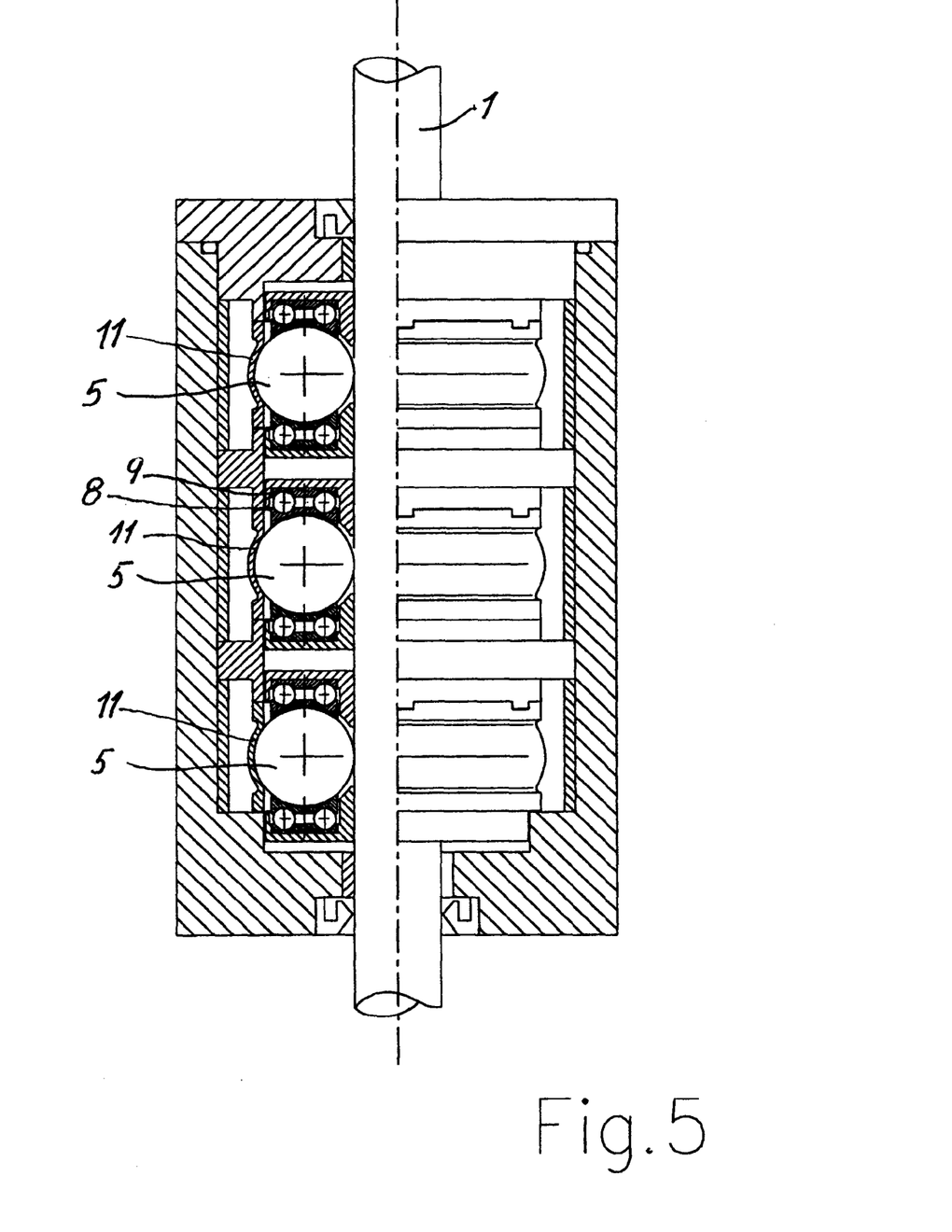
FIG. 5 a friction driving mechanism construction consisting of three after each other placed friction driving mechanisms for increasing the possible transmission of force FIG. 6 a perspective illustration of an alternative embodiment of the friction driving mechanism as some portions have been deleted FIG. 7 a perspective illustration of the driving mechanism in FIG. 6 illustrating clamping means for clamping the members of the holder against each other FIG. 9 a perspective illustration of an embodiment in which the outer bearing bush is fixed in relation to the outer house FIG. 8 a perspective illustration of the embodiment in which the inner house (the holder) is fixed in relation to the outer house and FIG. 10 an alternative embodiment in which the surrounding bearing bush consists of two in relation to each other axially movable members.

Each bearing bush 6 is by means of bearing 8 rotatable positioned in relation to another portion 9 which is fixed in relation to the inner house 3 (the holder) consisting of two halves 3a,3b. These halves may by means of special clamping means 10 be pressed more or less against each other so as to adjust the friction between the ball 5 and the bearing bush 6 and through that the friction between the ball 5 and the shaft 1. Each clamping means 10 may comprise a spring, conf. FIG. 4. The axes of rotation of the balls 5 are as previously mentioned oblique in relation to the axis of the through going shaft 1. If the inner house 3 is maintained the shaft 1 will make a movement back and forth during a rotation of the shaft 1. To press the balls 5 particularly hard against the shaft 1 and through that increase the friction and the force to be transmitted by means of the shaft 1, a surrounding bearing bush 11 having a circular section with a radius substantially corresponding to the radius of the individual ball 5, may be placed around the balls 5. This bearing bush 11 which is lubricated at the inner side and therefore allows that the ball 5 as a result of its oblique position slips in relation to the bearing bush 11 (aquaplaning), may f. inst. consist of a ring formed body with bulbs along the edges. FIG. 1 illustrates the whole friction driving mechanism in sectional view of the shaft 1 which is surrounded by three balls 5 embedded in the inner house 3, said balls 5 protruding a little from the inner house 3 and being surrounded by the bearing bush 11. The inner house 3 inclusive the bearing bush 11 is in turn surrounded by an outer fixed house 13, conf. FIG. 2.

During the rotation of the shaft 1 the inner house 3 may as previously mentioned be fixed, conf. FIG. 4, f. inst. by means of a to the outer house 13 secured projection which has been inserted in an opening in the inner house 3 or by means of a to the inner house 3 secured projection which has been inserted in an opening in the outer house 13. In this case the bearing bush 11 will also make a rotation, typically at a speed of rotation which is a fraction of the speed of rotation of the shaft 1 as the speed of rotation of the bearing bush 1 is reduced by the fraction $$\frac{r_{shaft}}{r_{outer\ ring}}$$

where $r_{shaft}$ is radius of the shaft 1 and $r_{outer\ ring}$ is radius the surrounding bearing bush 11.

As a result there has been provided a gear which could be used in specific situations.

Figure 3:
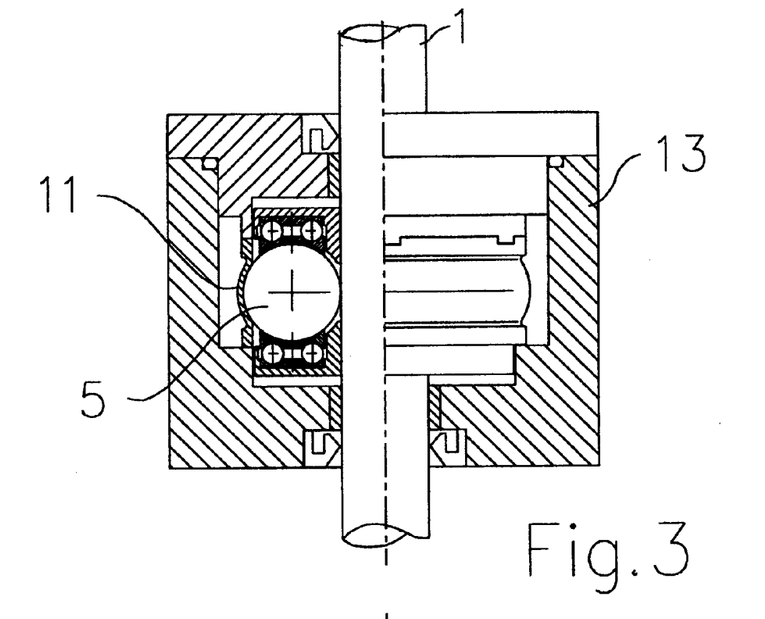

Alternatively the bearing bush 11 could be fastened to the outer house 13, conf. FIG. 3, while the inner house 3 is rotatable in relation to the outer house 13. The fastening may f. inst. be provided by means of special in relation to the outer house 13 fixed engagement portions which are in engagement with the bearing bush 11 along the border. In this case the inner house 3 will rotate with a speed of rotation which is a fraction of the speed of rotation of the shaft 1. Also in this case there has been provided a gear which may be used in specific situations.

Either the inner house 3 or the bearing bush 11 has to be fixed to the outer house 13.

The force to be transmitted is f. inst. 10-100 kp.

The friction driving mechanism according to the invention is primarily characterised by having a substantially longer lifetime than previously known due to the fact that the wear is not concentrated in the same areas. A further advantage is that it is simple and cheap in production and only requires a few components which may be mounted automatically.

The friction driving mechanism may in principle be produced in all dimensions and there are a lot of applications f inst. in connection with gates, sliding doors, turnouts and hatches etc.

Figure 6:
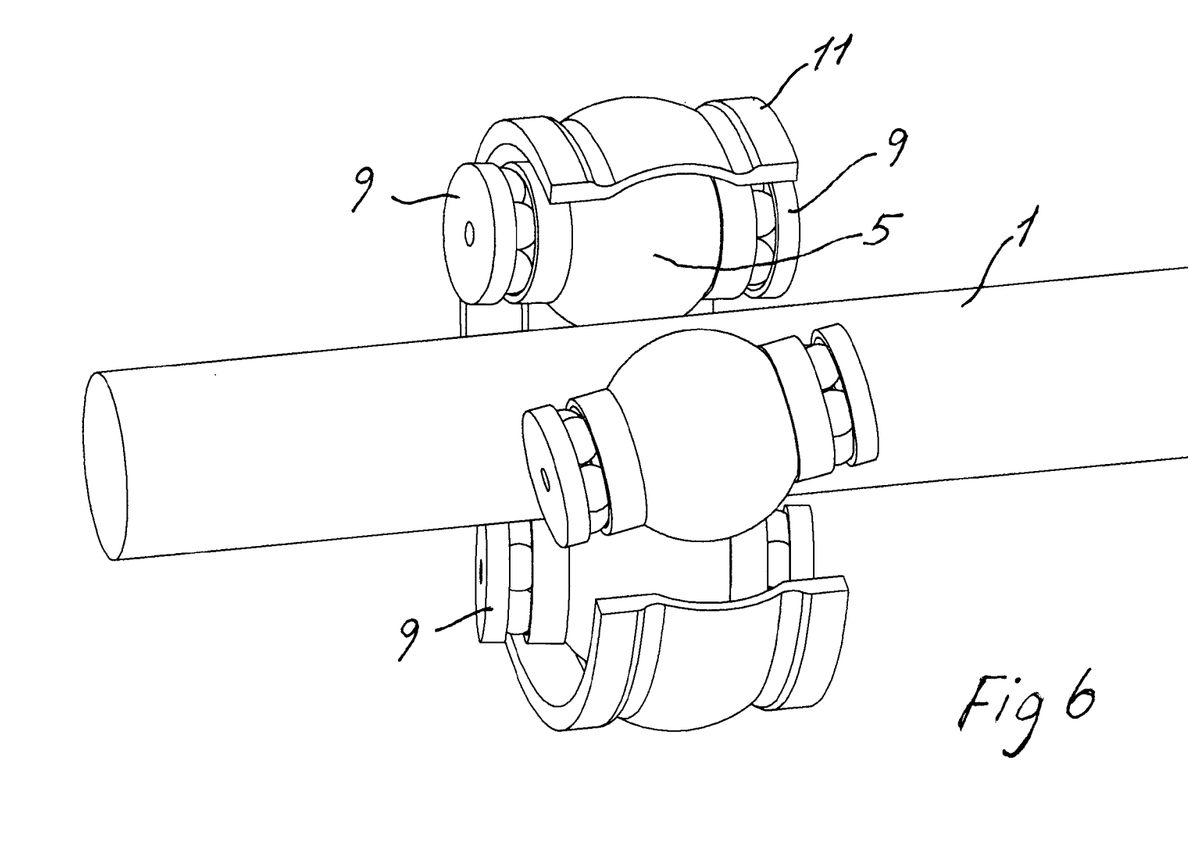

FIG. 6 is a perspective illustration of an alternative embodiment of the friction driving mechanism without the holder 3 and the clamping means pressing the portions 3a,3b of the holder against each other. It is clearly illustrated that the axis of rotation of each ball 5 is oblique in relation to the longitudinal axis of the rotatable shaft 1. The rotatable bearing bush 11 is also illustrated, a part of it is however deleted.

Figure 7:
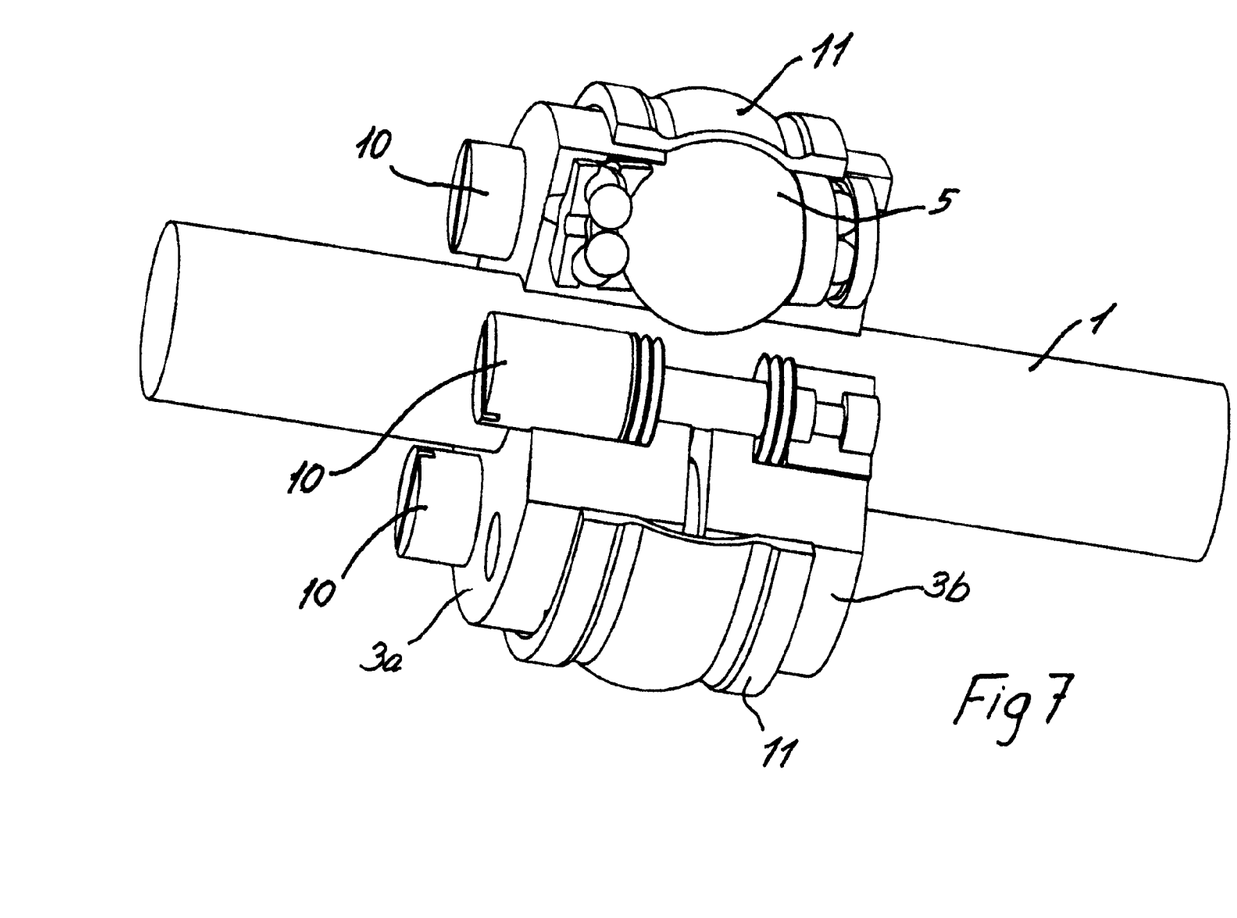

FIG. 7 illustrates the friction driving mechanism in FIG. 6 including the holder 3 consisting of two portions 3a,3b and the clamping means 10 in form of clamping screws pressing the portions 3a,3b of the holder against each other. It is possible to adjust the force with which the portions 3a,3b are pressed against other, f. inst. by inserting of one or several discs behind each spring. The force with which the portions 3a,3b are pressed against each other is per se determining for the force with which the individual ball 5 is in friction engagement with the shaft 1, said force being determining for the axial displacement force in relation to the shaft 1. Thus it is possible to obtain a greater displacement force by adjusting the clamping means 10.

Figure 8:
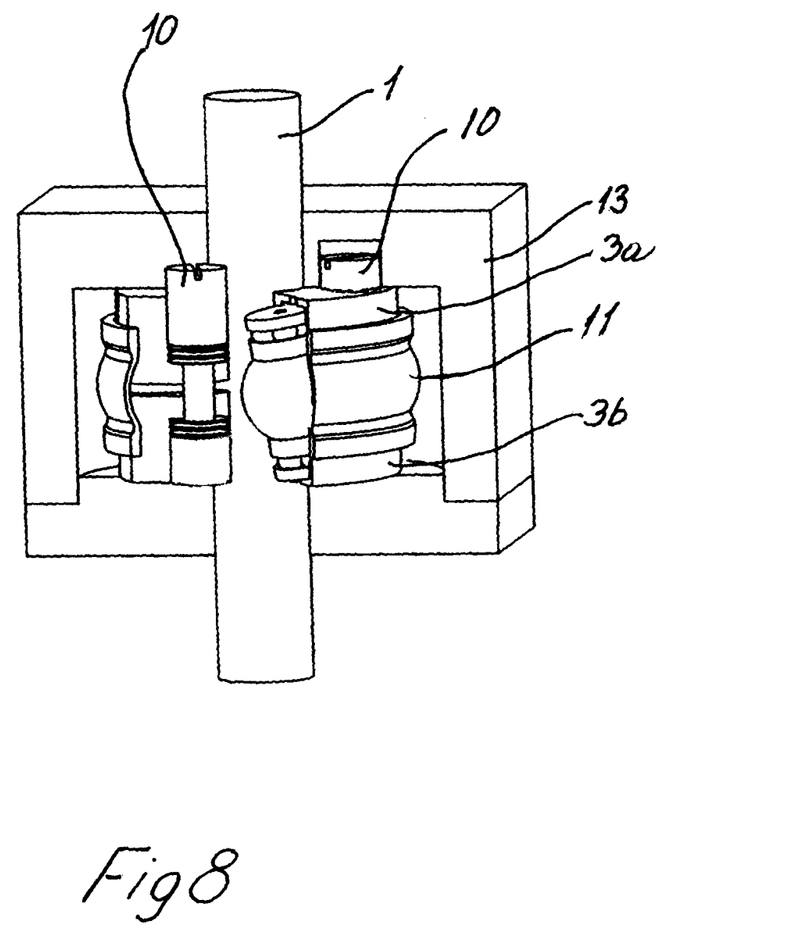

FIG. 8 is perspective illustration of an embodiment in which the holder 3 is fixed in relation to the outer house 13 as it is illustrated how one end of each clamping means 10 is inserted into a correspondingly formed cavity at the inner side of the outer house 13 whereby the holder 3a,3b is unable to rotate in relation to the outer house 13.

Figure 9:
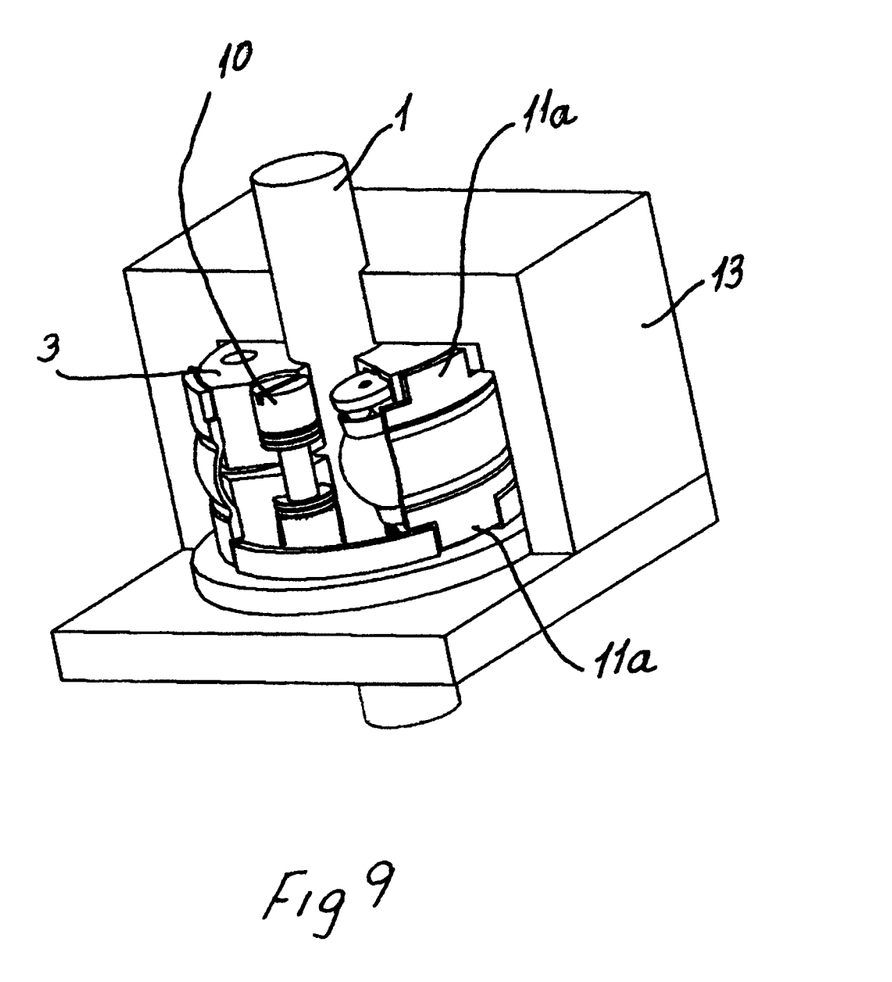

FIG. 9 is a perspective illustration of an embodiment, where the outer bearing bush 11 is instead fixed in relation to the outer house 13, as the outer bearing bush has an axial extending extension 11a, which is in engagement with an in relation to the outer house 13 inner flange having a cutout corresponding to the extension 11a. As a result the inner holder 3 is rotatable in relation to the outer house 13. This gives, if it is assumed that everything else is unchanged, a smaller increase than if the holder was fixed in relation to the outer house 13.

A special advantage of the here illustrated bearing bush 11 is that it does not have to be produced with special fine tolerances as the elasticity of the material of the bearing bush could be used. The bearing bush 11 only has to be dimensioned to provide a sufficiently high pressure against the balls 5 so that the pressure of the balls 5 against the shaft 1 becomes sufficiently high. By dimensioning the bearing bush 11 so that a great pressure is exercised against the shaft 1 the bearing bush 11 will also deviate a little from circular form.

Figure 10:
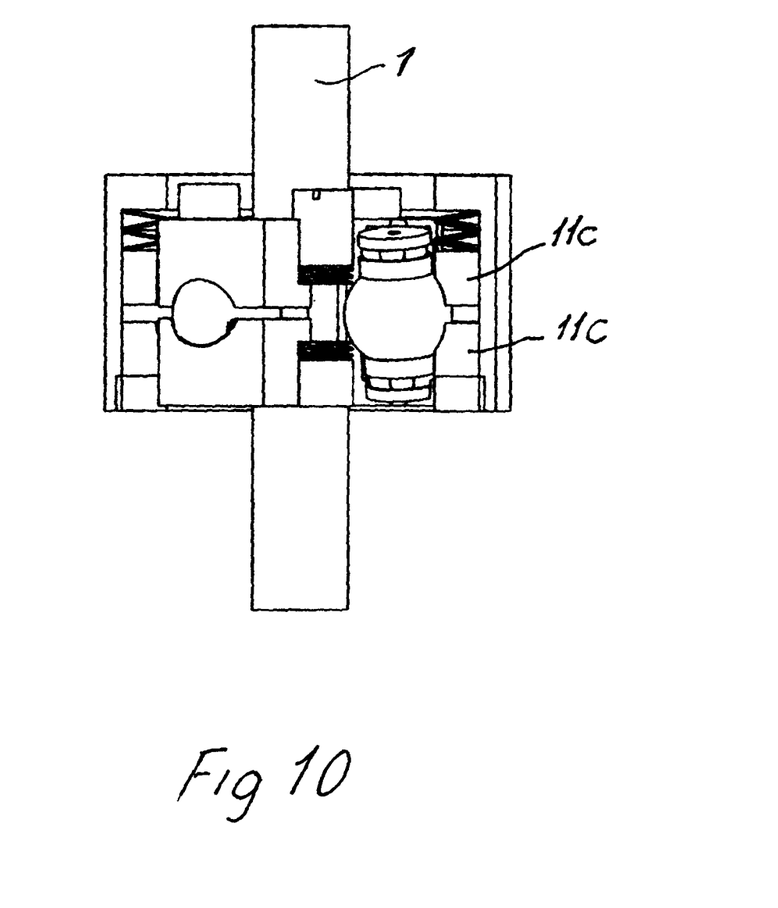

FIG. 10 illustrates an embodiment where the bearing bush 11 consists of two in relation to each other axially movable portions 11c. The two portions are pressed against each other by means of a spring and are secured in relation to the outer house 13. The distance between the two portions 11c may be adjustable. An advantage is that it is possible to adjust the maximum force to be transmitted to the shaft 1 by means of the balls 5. It is therefore unnecessary to exchange the bearing bush if a greater force is required.

The invention claimed is:

1. A friction driving mechanism for converting a rotating movement of a member into an axial movement of the member, the friction driving mechanism including driving means and friction means connected to the member, said friction means comprising a holder, a plurality of rotatable balls that are mutually movable relative to the member and the holder axes of rotation of said balls being oblique in relation to a longitudinal axis of the rotating member, each of the plurality of rotating balls is in contact with a rotatable bearing bush, each rotatable bearing bush in some areas is closely connected to each ball and is in frictional engagement therewith.

2. The friction driving mechanism according to claim 1, wherein the holder comprises two portions connected to each other through elastic clamping means clamping against the rotatable bearing bushes for the balls.

3. The friction driving mechanism according to claim 2, wherein the clamping means may be adjusted by adjusting the distance between the two portions of the holder.

4. The friction driving means according to claim 1, wherein the axis of rotation of the plurality of balls is oblique to obtain an increase of 1-30 degrees.

5. The friction driving mechanism according to claim 1, further comprising a bearing bush surrounding the plurality of balls so as to increase the pressure against the rotating member.

6. The friction driving mechanism according to claim 1, wherein the holder is fixed in relation to an outer fixed housing while the bearing bush surrounding the plurality of balls is freely rotatable.

7. The friction driving mechanism according to claim 1, wherein the bearing bush surrounding the plurality of balls is fixed in relation to the outer housing, while the holder is freely rotatable.

8. The friction driving mechanism according to claim 5, wherein the surrounding bearing bush comprises two portions that are axially movable in relation to each other.

9. The friction driving means according to claim 1, wherein the axis of rotation of the plurality of balls is oblique to obtain an increase of 9 or 14 degrees.

* * * * *